United States Patent
Van Der Kamp et al.

(10) Patent No.: US 10,154,654 B2
(45) Date of Patent: Dec. 18, 2018

(54) ARRANGEMENT AND METHOD TO DETERMINE A BODY CONDITION SCORE OF AN ANIMAL

(71) Applicant: Lely Patent N.V., Maassluis (NL)

(72) Inventors: Adolf Jan Van Der Kamp, Maassluis (NL); Xiangyu Song, Rotterdam (NL); Patrick Philip Jacob Van Der Tol, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 15/301,150

(22) PCT Filed: Mar. 6, 2015

(86) PCT No.: PCT/NL2015/050141
§ 371 (c)(1),
(2) Date: Sep. 30, 2016

(87) PCT Pub. No.: WO2015/152708
PCT Pub. Date: Oct. 8, 2015

(65) Prior Publication Data
US 2017/0020113 A1    Jan. 26, 2017

(30) Foreign Application Priority Data

Apr. 1, 2014   (NL) ..................... 2012540

(51) Int. Cl.
*A01K 29/00*    (2006.01)
*H04N 13/204*   (2018.01)
(Continued)

(52) U.S. Cl.
CPC ............ *A01K 29/005* (2013.01); *A01K 29/00* (2013.01); *A61D 17/00* (2013.01);
(Continued)

(58) Field of Classification Search
CPC .................. A01K 29/005; A61D 17/00; G06T 2207/10028; G06T 7/62; H04N 13/0203
See application file for complete search history.

(56) References Cited

U.S. PATENT DOCUMENTS 8,425,434 B2 * 4/2013 Mulder ................. A01K 29/00
                                                        119/51.01
2006/0126903 A1   6/2006 Sharony
(Continued)

FOREIGN PATENT DOCUMENTS

| WO | 2004/012146 A1 | 2/2004 |
| WO | 2010/012431 A1 | 2/2010 |
| WO | 2010/063527 A1 | 6/2010 |

OTHER PUBLICATIONS

International Search Report dated Sep. 28, 2015 in PCT/NL2015/050141 filed Mar. 6, 2015.

*Primary Examiner* — Siamak Harandi
(74) *Attorney, Agent, or Firm* — Oblon, McClelland, Maier & Neustadt, L.L.P.

(57) ABSTRACT

A method to determine a body condition score of an animal including: providing a three-dimensional camera system configured and arranged to record at least one three-dimensional image of the animal, and an image processing device to process the image; recording at least one three-dimensional image of the animal; processing the image. The processing the image includes: forming a three-dimensional surface representation of a part of the animal from the three-dimensional image recorded by the three-dimensional camera system; determining, in the image, reference points of the animal, at least including hook bone points and pin bone points of the animal; selecting a surface part of the animal representative for a body condition of the animal using the reference points; analyzing a first parameter representative for a body condition of the animal of the selected (Continued)

surface part; and determining the body condition score based on the first parameter.

21 Claims, 8 Drawing Sheets (51) Int. Cl.
*A61D 17/00* (2006.01)
*G06T 7/62* (2017.01)
*G06K 9/00* (2006.01)

(52) U.S. Cl.
CPC ............ *G06K 9/00362* (2013.01); *G06T 7/62* (2017.01); *H04N 13/204* (2018.05); *G06T 2207/10028* (2013.01)

(56) References Cited

U.S. PATENT DOCUMENTS

2011/0126770 A1  6/2011  Mulder et al.
2011/0279650 A1  11/2011  Liao et al.

* cited by examiner

ARRANGEMENT AND METHOD TO DETERMINE A BODY CONDITION SCORE OF AN ANIMAL

The invention relates to a method and arrangement to determine a body condition score of an animal, in particular a cow, using three dimensional images of the animal.

At present, the body condition score is a subjective measurement of energy reserved in animal body fat. It is commonly used for monitoring and reproductive performance in the dairy industry. Although several studies (Coffey et. al., 2003; Leroy et. al., 2005; Pompe et. al., 2005) have been done to explore automated and objective body condition score systems since 2003, there is still no fully acceptable product available in the market.

Since most body condition score measurements are assessed visually, vision techniques are used to automatically determine the body condition score of dairy cows. However, because of disturbances from ambient illumination noise and the complicated barn environment, the body condition score is difficult to measure consistently.

WO 2010/063527 discloses a general method and arrangement to determine a body condition score of an animal using three dimensional images of the animal. For further details on this general method and arrangement reference is made to WO 2010/063527, the contents of which are herein incorporated by reference.

It is an object of the present invention to further ameliorate the basic method and arrangement disclosed in WO 2010/063527, and/or to provide an alternative method and arrangement.

The present invention provides a method to determine a body condition score of an animal comprising the steps of:
providing a three-dimensional camera system configured and arranged to record at least one three-dimensional image of the animal, and an image processing device to process the image;
recording at least one three-dimensional image of the animal;
processing the image of the animal;
wherein processing of the image comprises the steps of:
forming a three-dimensional surface representation of a part of the animal
from the three-dimensional image recorded by the three-dimensional
camera system;
determining, in the image, reference points of the animal, in particular at least including hook bone points and/or pin bone points of the animal;
selecting a surface part of the animal representative for a body condition of the animal using the reference points;
analyzing, e.g. statistically analyzing, a first parameter representative for a body condition of the animal of the selected surface part; and
determining the body condition score on the basis of the first parameter.

It has been found by the inventors that the reference points formed by hook bone points and/or pin bone points in a three dimensional image can advantageously be used to determine a first parameter that is representative for a body condition of the animal. By using these reference points, the determination of the body condition can be performed more accurately and/or in a more simple and efficient manner.

The hook bone points are the highest points of the hip bones, also indicated as hook bones that define the hips of the animal.

It is remarked that the statistical analysis may be performed before the actual calculation of the respective parameter. The statistical analysis may for example be translated in an equation or table representative for the outcome of the statistical analysis. The use of such equation or table is also regarded to be a statistical analysis according to the invention.

In an embodiment, the method comprises:
determining an average height for a number of longitudinal lines of the surface part to obtain an average height cross section profile of the animal; and
determining the first parameter on the basis of the average height cross section profile.

It has been found that the body condition score of an animal, in particular a cow may be efficiently and reliably be determined on the basis of average height cross section profile.

In this method, the standard deviation of heights of a part, in particular a middle part of the average height cross section profile may be used as a first parameter to determine a body condition score of the respective animal.

In such embodiment, the body condition score may be calculated as:

$$BCS = A_{SD} - B_{SD} * SD$$

wherein BCS is the body condition score, SD is the standard deviation of heights of at least a part of the average height cross section profile of the animal, and $A_{SD}$ and $B_{SD}$ are predetermined constants, wherein $A_{SD}$ is in the range of 5 to 9, preferably about 6 to 7 and $B_{SD}$ is in the range of 200 and 500, preferably about 225 to 325.

In an alternative embodiment based on the average height cross section profile, analyzing the first parameter may comprise:
determining a median height or an average height of the average height cross section profile;
determining a highest point of the average height cross section profile, and
determining a height difference between the highest point and the median height or average height as a first parameter representative for a body condition score of the animal.

It has been found that this difference in height in a selected surface part of the average height cross section profile, in particular a middle part of the average height cross section profile may be used to determine a body condition score of an animal.

In such embodiment, the body condition score may for example be calculated as:

$$BCS = A_{HD} - B_{HD} * HD$$

wherein BCS is the body condition score, HD is the difference in meters between the median height and the highest point of at least a selected part of the average height cross section profile of the animal, and $A_{HD}$ and $B_{HD}$ are predetermined constants, wherein $A_{HD}$ is in the range of 4 to 8, preferably 4,5 to 6,5 and $B_{HD}$ is in the range of 50 and 200, preferably 75 to 150.

In an embodiment using the standard deviation or a height difference within a selected part of the average height cross section profile, the selected part may comprise 10 to 30 cm at each side of a highest point of the average height cross section profile of the animal, preferably 15 to 25 cm.

In embodiments, the surface part on the basis of which the body condition score is determined, is selected from the group consisting of:
a trapezoidal surface part between hook bone points and pin bone points;
a triangular surface part between hook bone points and tail head point; and a rectangular surface part extending, in a longitudinal direction of the animal, from a hook line connecting the hook bone points to a pin line connecting the pin bone points, and, in a direction perpendicular to the longitudinal direction 15 cm to 25 cm, preferably about 20 cm at each side from a spine line of the animal.

To determine a value representative for the body condition score of the animal, in particular a cow, the first parameter may be calculated as a standard deviation of heights of the surface representation in the surface part.

A relationship between the body condition score and the first parameter may be obtained by linear regression.

In an embodiment, the method comprises the steps of:
analyzing a second parameter representative for a body condition of the animal; and
determining the body condition score on the basis of the first parameter and the second parameter. By using two parameters that are both representative for a body condition of the animal, the accuracy with which the body condition score can be calculated may be further increased. One or both of the first and second parameters may be determined by using the reference points, in particular the hook bone points and/or the pin bone points.

In an embodiment, analyzing the second parameter comprises determining the second parameter on the basis of the average height cross section profile. Since the average height cross section profile is suitable for determining the body condition score of the animal, both the first and the second parameter may be determined on the basis of this average height cross section profile.

For example, a first parameter may be based on the standard deviation of heights of a part of the average height cross section profile, and the second parameter may be determined as a height difference between the highest point and the median height or the average height of the average height cross section profile.

In an embodiment, the body condition score can be calculated by:

$$BCS = A_C - B_{CSD} * SD - C_{CHD} * HD,$$

wherein BCS is the body condition score, SD is the standard deviation of heights of at least a selected part of the average height cross section profile of the animal, HD is the difference in meters between the median height and the highest point of at least a selected part of the average height cross section profile of the animal and wherein $A_C$, $B_{CSD}$ and $C_{CHD}$ are predetermined constants, wherein $A_C$ is in the range of 4 to 8, preferably 6 to 7, $B_{CSD}$ is in the range of 100 to 300, preferably 150 to 250, and $C_{CHD}$ is in the range of 20 to 100, preferably 25 to 75.

It is also possible to use other parameters representative for a body condition of the animal.

For example, the first parameter representative for the body condition of an animal, the first parameter may be a shortest distance between a line connecting the hook bone points and the tail head point or a surface area of a triangular part delimited by the hook bone points and the tail head point. It is remarked that any of these first parameters may be used in combination with other parameters representative for the body condition of an animal, to further increase the accuracy of the present method.

In an embodiment, determining the body condition score is based on the first parameter and a further parameter of the animal, wherein the further parameter is preferably a body weight of the animal.

The combination of a first parameter in combination with the body weight of the animal may further increase accuracy of the body condition score determined with the method according to the invention. Body weight may in particular be combined with a first parameter defined by a shortest distance between a line connecting the hook bone points and the tail head point or a surface area of a triangular part delimited by the hook bone points and the tail head point.

In an embodiment, the step of forming a three-dimensional surface representation of a part of the animal from the three-dimensional image recorded by the three-dimensional camera system comprises one or more of the steps:
rotating the image based on the relative position of the camera system with respect to the animal;
removing background and noise in the image;
performing interpolation in the image; and/or
centralizing the image, for example by determining, in the image, a spine line of the animal, and translating and rotating the image to align the spine line with a central image axis.

In an embodiment, the method of determining reference points comprises:
selecting a local area of the image in which a location of the respective reference points is expected, and
determining the location of the respective reference point by finding a highest or a lowest surface point within the local area.

After processing of the image in which steps such as rotating the image based on the relative position of the camera system with respect to the animal, removing background and noise in the image, performing interpolation in the image; and/or centralizing the image are performed, the local areas in which certain reference points are located are coarsely known. By selection of such area and subsequently determining, within such local area, with high accuracy the location of the respective reference point by finding a highest or a lowest surface point in the local area, the reference points such as hook bone points and tail head points can be relatively accurately and reliably be determined in an efficient manner.

Processing of the image is required in order to obtain reliable results.

The invention further provides an arrangement configured to determine a body condition score of an animal, comprising:
a three-dimensional camera system configured and arranged to record at least one three-dimensional image of the animal, and
an image processing device to process the image;
wherein the camera system and image processing device are configured to perform a method according to any of the claims 1-14.

Embodiments of a method and arrangement according to the invention will now be described in further detail, by way of example only, with reference to the accompanying drawings, in which.

Figure 1:
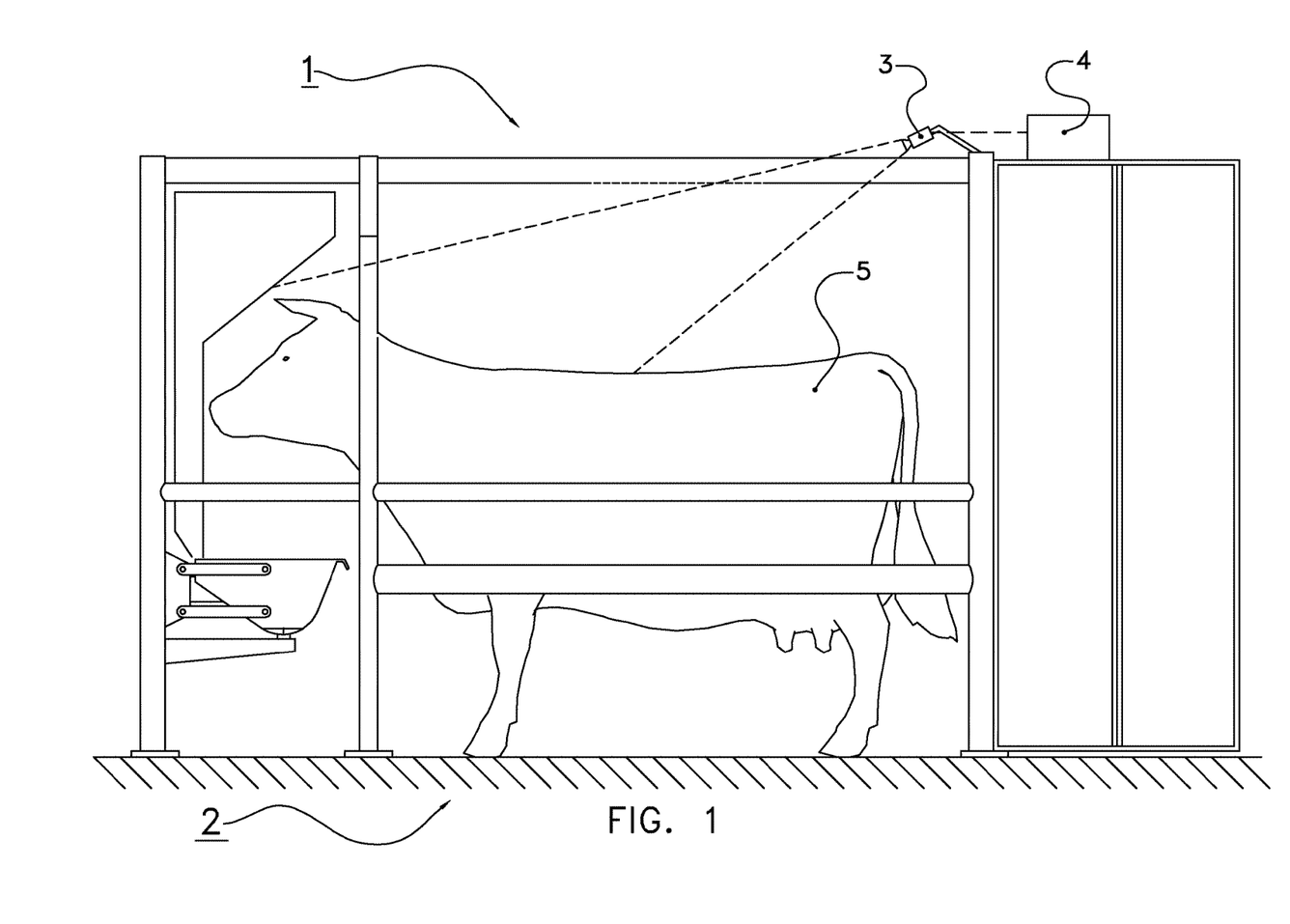
FIG. 1 shows an embodiment of an arrangement according to the invention.

FIG. 1 shows an arrangement 1 configured to determine a body condition score of an animal 5, for example a cow or an other milking animal. The arrangement 1 is provided in a location 2 defined by fences to limit movement of the animal 5. The location 2 is provided with a feeding device to feed the animal, but may also be provided with other devices.

The arrangement 1 comprises a three-dimensional camera system 3 configured and arranged to record at least one three-dimensional image of the animal, and an image processing device 4 to process the image. Such three-dimensional camera system 3 may comprise any suitable three dimensional camera such as an ASUS Xtion Pro Live (depth) having a resolution 640*480 and taking images at a rate of 30 frames per second.

The camera system 3 may be provided for example at least 2 m, for example 2.2 meters above floor level at a camera angle of less than 10 degrees, for example 2 degrees facing down towards the animal arranged in the location 2.

The processing device 4 may be any suitable device for processing the three dimensional images taken by the three-dimensional camera system 3, and may be a separate device or integrated in the three-dimensional camera system 3. The processing device 4 may also be integrated in a central processing device, for example a central computer device configured to monitor a number of animals, such as a herd management system, and/or configured to monitor and control one or more automatic feeding devices.

The camera system 3 is connected to the processing device 4 to transfer images taken by the camera system 3 to the processing device 4.

The camera system 3 and the processing device 4 are part of a monitoring device configured to determine a body condition score of the animal 5. The arrangement may also comprise an animal identification system in order to assign a recorded image and other animal related data, such as size parameter and volume parameter to the stored data of the respective animal 5.

The camera system 3 may be configured to periodically, for example daily or weekly record an image of the respective animal 5. The periods may be fixed, but in practice the periods between two subsequent images may differ in order to monitor development of the body condition score of the animal 5 in the course of time. For example, the time between two consecutive images may depend on the visits of the animal of the location 2. The period between two images may also be dependent on variables such as the age of the animal, the body condition score history of the animal and the current health of the animal.

The processing device 4 is configured to process the image. Processing of the image involves a number of steps to process the image from coarse image data as obtained by the camera system 3 to a three-dimensional surface representation of at least part of the animal 5 that can be used to determine a body condition score of the animal 5.

Figure 2A:
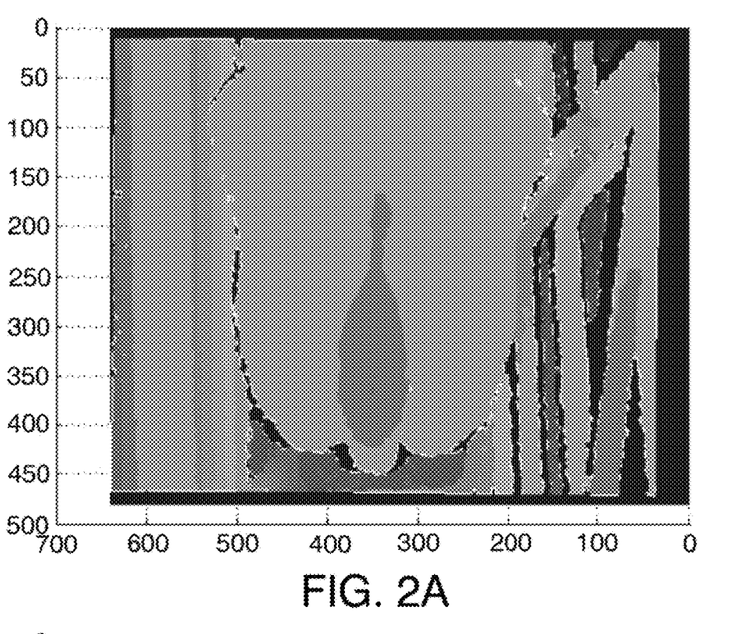
FIGS. 2a-2f show results of subsequent steps of processing a three-dimensional image and determination of reference points.
Figure 2B:
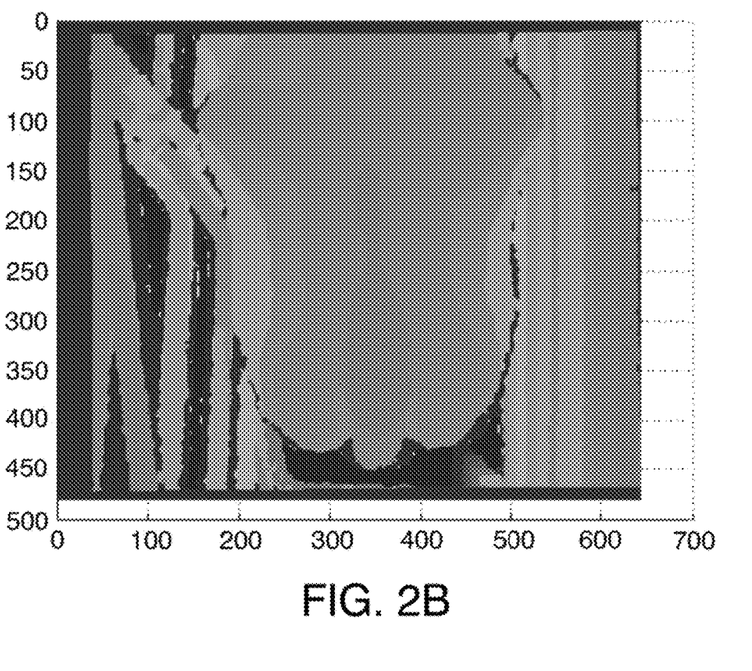

As a first step, shown in FIG. 2a, the coarse image data obtained by the three-dimensional camera system 3, usually comprising distance data from camera to animal, is transformed to data in an orthogonal coordinate system. As a next step, the image is three dimensionally rotated to compensate the camera angle with respect to the animal. FIG. 2b shows the image data after rotation for compensation of the camera angle.

Figure 2C:
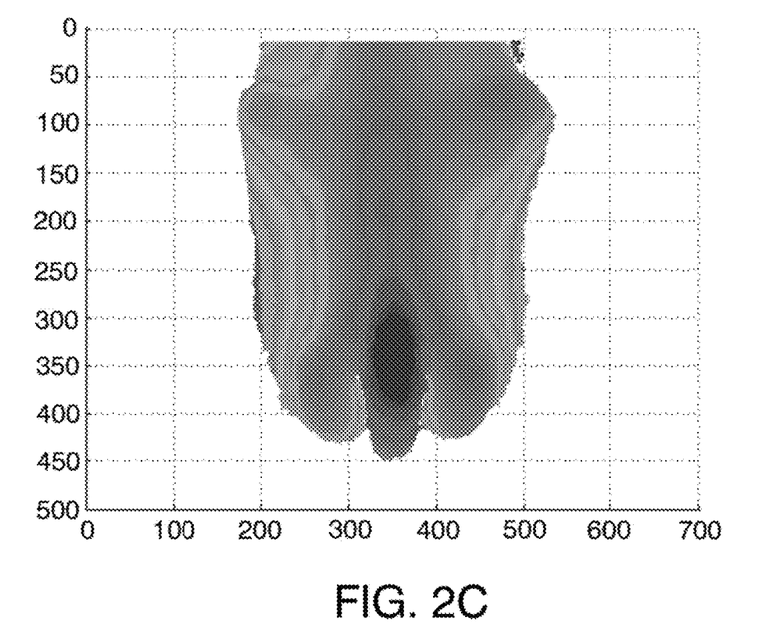

Then, noise and background in the image may be removed. Noise can be removed by known filtering techniques. Furthermore, it is known that some fixed objects such as fences may be present in the image. It is advantageous to filter out this background as this may influence the results in later steps of the method. FIG. 2c shows the processed image after filtering out noise and background features.

Figure 2D:
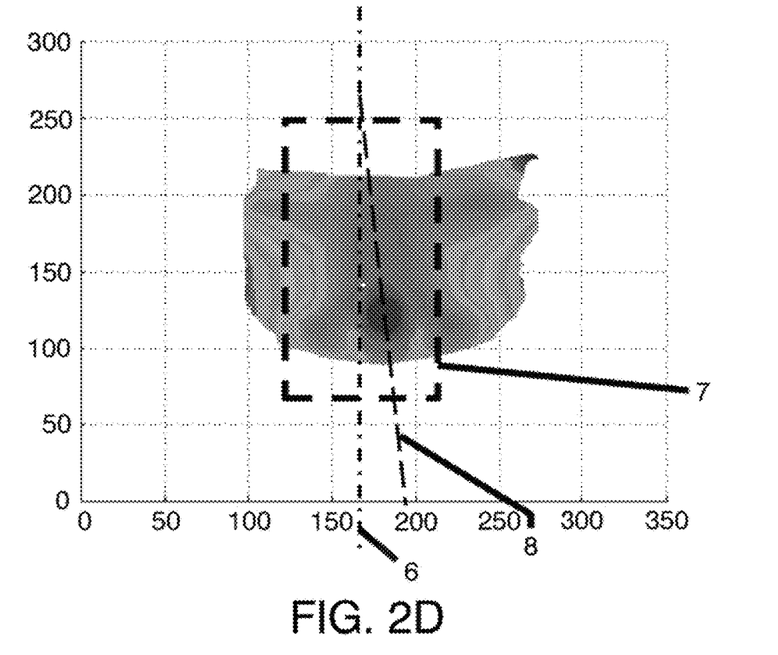

As a result of the first image processing steps the image points may have a coarse distribution in some areas of the image and/or have a very fine distribution in other areas of the image. For further processing of the image, it is desirable to have a relative even and fine distribution of image points over the image. To obtain such even and fine distribution of image point over the whole images new point may be defined by interpolation between surrounding image points. In this way, an even distribution with an accuracy of for example 2 to 5 mm, such as 3 mm may be obtained. It may be possible to recalculate the points to an even distributed matrix of image points having rows and columns with a constant pitch of for example 3 mm. FIG. 2d shows the image after interpolation of the image.

Figure 2E:
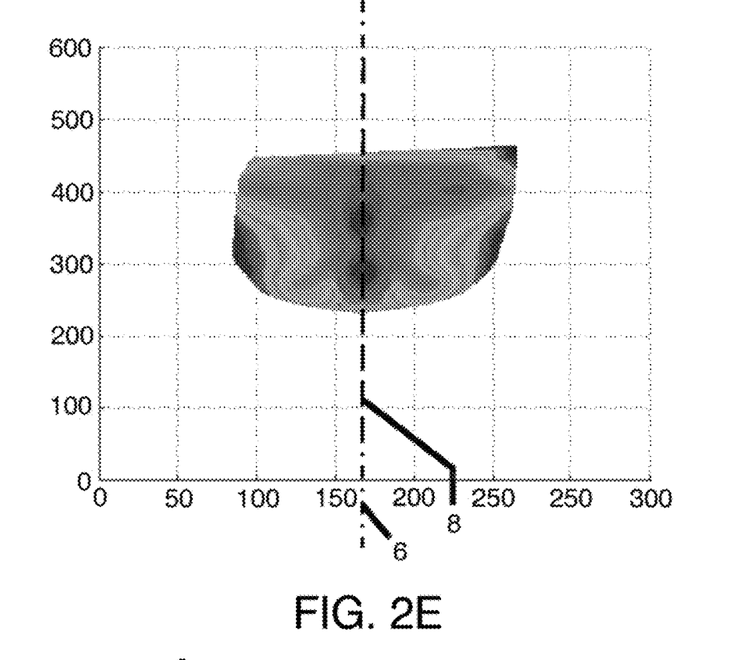

Finally, the image is centralized at a predetermined central image axis 6 (shown in FIGS. 2d and 2e). To properly define relevant surface parts of the image, it is desirable that the image is arranged at a suitable angle with respect to the image axes, i.e. the axes of the coordinate system in which the image is defined. In particular, it is desirable to align the spine line 8, i.e. the longitudinal axis of the spinal ridge, with a central image axis 6 of the coordinate system in which the image is defined.

This centralizing step can be performed by determining, in the image, a spine line 8 of the animal, and translating and rotating the image to align the spine line with the central image axis 6 (compare FIGS. 2d and 2e). Since the coarse position of the animal 5 in the image is known, the spine line 8 can be found by finding the highest points of the image in an area 7 of the image where the spine is expected, and defining the spine line as a straight line through the highest points in this area 7.

The area 7 can for example be defined as an area extending equally at opposite sides of the central image axis 6 as shown in FIG. 2d, but can also be determined on the basis of coarse image data, for example by calculating an area having a relative large number of high points in the image.

In an embodiment, the spine line can be coarsely estimated by summing all points in length direction of the animal 5, resulting in a height profile in width direction of the animal 5, and defining a coarse spine line at the highest point of the height profile. Subsequently, the spine line can be determined more accurately by finding the highest point in an area extending at both sides of the coarse spine line, such as area 7.

The processing of the image may further comprise normalization of the image to make a better comparison of different images of the same animal or, in some cases, between results of different animals.

Figure 2F:
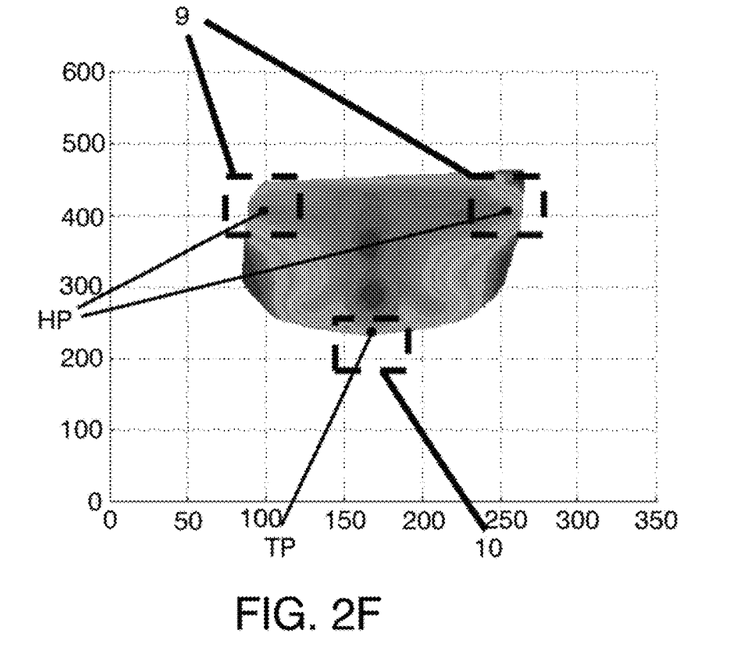

When processing of the image has been finished, size reference points, in particular hook bone points HP and pin bones points PP may be localized in the image, as shown in FIG. 2f. To localize hook bone points HP and pin bones points PP the following method is used.

As the position of the hook bone points HP and pin bone points PP can coarsely predicted from the image data and the general anatomy of the animal 5, local areas 9, 10 can be defined of the image in which a location of the respective size reference points is expected.

For example, to coarsely predict the location of the hook bone points HP and the pin bone points PP, all points are summed in the width direction to obtain a height profile in the length direction. On the basis of the height profile in length direction the hip line HL comprising the hook bone points HP and the pin line PL comprising the pin bone points PP can be determined. The hip line HL and the pin line PL are the highest lines in the subarea where these hip and pin lines can be expected on the basis of the image data and general anatomy of the animal 5. Subsequently, the respective reference points can be determined by a specific characteristic of the reference point within a local area.

For example, the hook bone points HP can be determined by first defining a local area 9 on the basis of coarse image data and/or general anatomical data of the respective animal 5, for example stored in a database; and by subsequently determining the location of the hook bone points by finding a highest surface point within the local area 9.

Similarly, the location of the pin bone points PP can be found by defining a local area 10 on the basis of coarse image data and/or general anatomical data of the respective animal 5, for example stored in a database; and thereafter finding the pin bone points PP by a suitable characteristic of the pin bone points, in particular the highest point in within the local areas 10.

Further points such as a cross point HS between spine line 8 and hip line HL and a cross point TH between spine line 8 and pin line PL can be determined. In the shown embodiment, the cross points HS and TH are defined as the point halfway between the hook bone points HP and the pin bone points PP, respectively.

According to an embodiment of the invention the hook bone points HP and pin bone points PP may be used to analyze a first parameter representative for a body condition of the animal, whereby the first parameter is used to determine a body condition score of the cow 5. In particular, the hook bone points HP and the pin bone points PP may be used to define a trapezoidal surface part that is used as a basis for the analysis to determine a body condition score of the cow 5.

In alternative embodiments the triangular part between hook bone points HP and the tailhead point TH, or a rectangular part may be used. Also other characteristics may be used. In an advantageous embodiment of the invention, an average height cross section profile of a surface part is used to determine a body condition score of the animal.

Figure 3A:
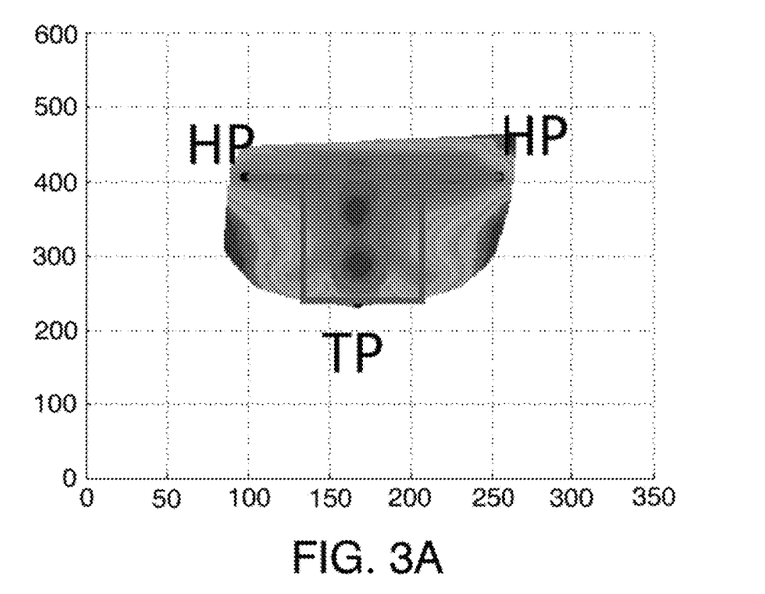
FIGS. 3a-3d show different parameters representative for a body condition score of an animal, in particular a cow.

FIG. 3a shows a first example for a definition of a first parameter to calculate the body condition score.

In FIG. 3a a surface part 11 is selected, wherein the selected surface part 11 is a rectangular spine region of the cow 5 having a length extending from a line 12 connecting the hook bone points HP up to the tail head point TH and a width of 50% to 80%, for example two thirds, of a distance between the two hook bone points HP and extending equally at opposite side of the central image axis 6/spine line 8.

This surface part 11 can be used as a representative part to determine the body condition score of the cow 5, in particular by calculating the standard deviation in height of this surface part 5. Thus calculating a standard deviation of the heights of the surface part 11 results in a value representative for the body condition score of the cow 5.

Figure 3B:
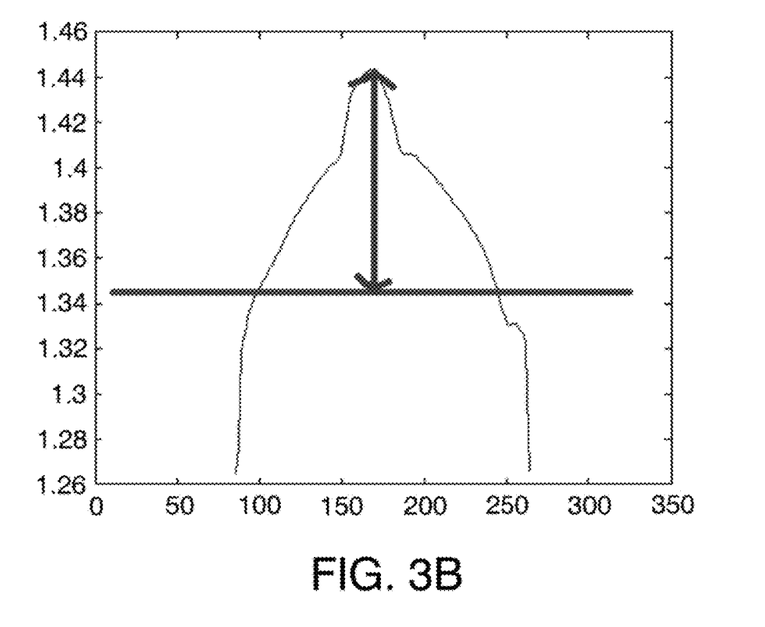

In FIG. 3b a second parameter for calculating a value representative for a body condition score of an animal is schematically shown. To obtain the second parameter, the following steps can be performed. First, an average height cross section profile of at least a back part of the cow 5 is obtained by determining for multiple, for example ten, lines perpendicular to the central image axis 6 height cross section profile, and subsequently determining an average of these height cross section profiles. The result is shown by a curved line in FIG. 3b.

This average height cross section profile may also be obtained by calculating an average height for a number of lines parallel to the central image axis 6 and combining these average heights into an average height cross section profile. On the basis of the average height cross section profile a highest point of the average body curve can be calculated and also an average or median height of the average height cross section profile can be calculated, the latter shown in FIG. 3b as a flat line.

When the highest point of the average height cross section profile and an average or median height of the average height cross section profile are known, the height difference D there between can be used as a parameter that can be analyzed, i.e. compared with statistic data, to calculate a body condition score of the respective cow 5. It is remarked that the statistical analysis may be performed before the actual calculation of the respective parameter. The statistical analysis may for example be translated in an equation or table representative for the outcome of the statistical analysis. The use of such equation or table is also regarded to be a statistical analysis according to the invention.

FIG. 3a and FIG. 3b each show a parameter representative for a body condition of the cow 5. Thus, each of these parameters can be used to calculate on the basis of statistical data a value that represents the body condition score of the cow 5 typically ranging from 1 to 5.

The results of the calculation of a body condition score may significantly improve when a combination of two parameters both representative for the body condition of a cow are used to determine a body condition score. For example a combination of the parameter shown in FIG. 3a and the parameter shown in FIG. 3b may be used to calculate the body condition score of a cow 5.

Figure 3C:
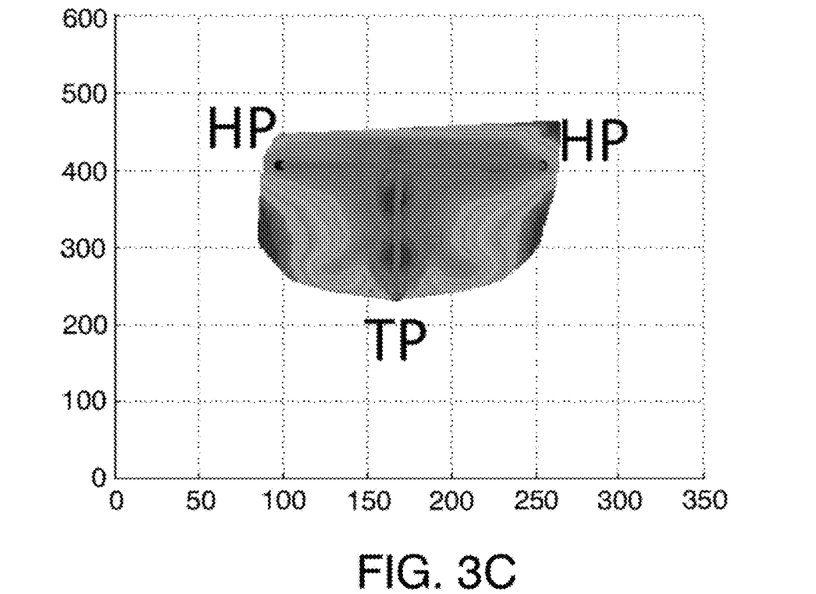
Figure 3D:
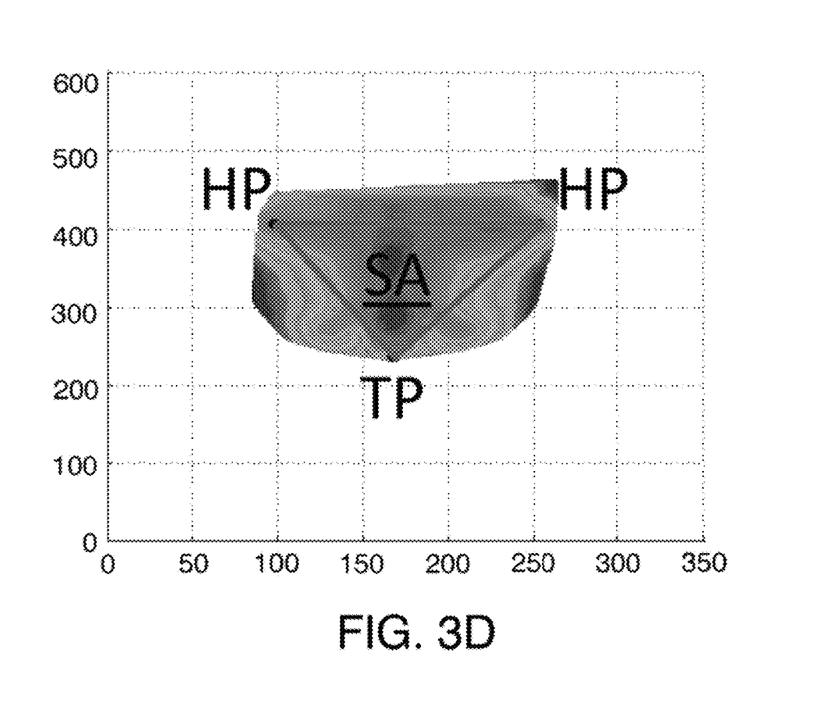

FIGS. 3c and 3d show two other parameters that can be used for calculation of a body condition score. In FIG. 3c, this parameter is the shortest distance H between a line connecting the hook bone points HP and the tail head point TP. In FIG. 3d, the parameter is a surface area of a triangular area TA formed by the hook bone points HP and the tail head point TP. These parameters can separately be used to calculate a body condition score of a cow 5 or in combination with each other or in combination with other parameters, for example the parameters shown in FIGS. 3a and 3b.

Another parameter that can be used in combination with any of the parameters shown in any of the FIGS. 3a-3d is the body weight of the cow 5. It has been found that although the body weight of a cow 5 as such may not be the most reliable parameter for predicting the body condition score of a cow 5, the use of body weight in combination with other parameters as described in this patent application may lead to better results in the determination of the body condition score of a cow 5.

It is remarked that in a further embodiment, the actual body weight of the cow 5, for instance directly obtained by a weight sensor in the location 2 may be adapted before use in a method to calculate the body condition score dependent on certain circumstances. For example a body weight of the cow may be adapted in dependence of recent milking of the cow 5 and/or recent intake of food or water by the cow 5. Since, in modern automatic milking devices more and more animal data is gathered and stored, body weight adapted on the basis of stored animal data can be more accurately and easily determined and used as a reliable parameter in the calculation of a body condition score, or more generally as a parameter for the prediction of the health status of a cow 5.

Figure 4:
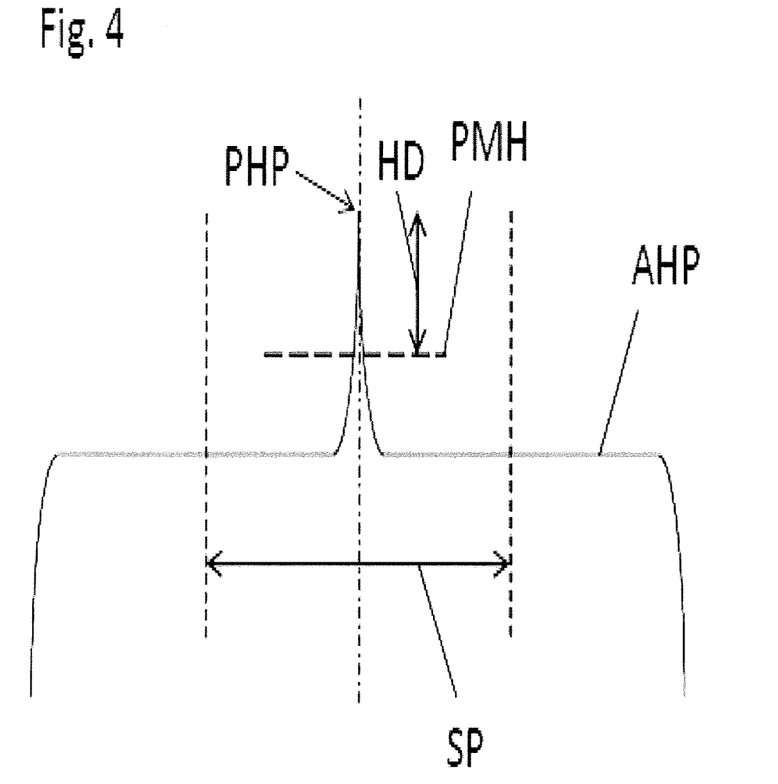
FIG. 4 shows further examples of parameters to be used in a method to determine a body condition score in accordance with an embodiment of the invention.

FIG. 4 shows another example of an average height cross section profile AHP calculated by determining an average height for each of multiple longitudinal lines, for example each pixel line, parallel to the spine line 8 of the surface representation. In practice, only a part of the cow e.g. the back end as shown in FIG. 2f is used to calculate the average height of each of the longitudinal lines.

The side ends of the average height cross section profile AHP may be unreliable and negatively influence the results of the determination of the body condition score. Therefore, a selected part SP is selected that is used for the determination of parameters. The selected part SP is a symmetric area with respect to the spine line/the highest point of the average height cross section profile AHP, wherein at both sides of the highest point a length of 20 cm is selected.

Within this selected part SP different parameters can be calculated to determine a body condition score of the animal. This body condition score may be based on one parameter, but can also be based on multiple parameters.

A first parameter that can be used to determine a body condition score using the average height cross section profile AHP is the standard deviation SD of the height values in the selected part of the average height cross section profile AHP.

It has been found that by linear regression the relationship between the body condition score BCS and the standard deviation, SD, of heights of the selected part SP of the average height cross section profile AHP can be expressed by:

$$BCS = A_{SD} - B_{SD} * SD,$$

wherein $A_{SD}$ and $B_{SD}$ are predetermined constants, wherein $A_{SD}$ is in the range of 5 to 9, preferably about 6 to 7 and $B_{SD}$ is in the range of 200 and 500, preferably about 225 to 325. In a specific embodiment $A_{SD}$ is approximately 6.8 and $B_{SD}$ is approximately 275.

A second parameter that can be used to determine a body condition score using the average height cross section profile AHP is the height difference HD between the highest point PHP of the average height cross section profile AHP and the median height PMH of the selected part SP of the average height cross section profile AHP. This height difference HD is also a reliable parameter to determine the body condition score of a cow. The relationship between the body condition score BCS and the height difference HD of heights of the selected part SP of the average height cross section profile AHP can be expressed by:

$$BCS = A_{HD} - B_{HD} * HD,$$

wherein $A_{HD}$ and $B_{HD}$ are predetermined constants, wherein $A_{HD}$ is in the range of 4 to 8, preferably 4.5 to 6.5 and $B_{HD}$ is in the range of 50 and 200, preferably 75 to 150. In a specific embodiment $A_{HD}$ is approximately 5.6 and $B_{HD}$ is approximately 134.

In another method to calculate the body condition score BCS the combination of the height difference HD and the standard deviation SD can be used to determine the body condition score. The relationship that can be determined by linear regression is:

$$BCS = A_C - B_{CSD} * SD - C_{CHD} * HD,$$

wherein $A_C$, $B_{CSD}$ and $C_{CHD}$ are predetermined constants, wherein $A_C$ is in the range of 4 to 8, preferably 6 to 7, $B_{CSD}$ is in the range of 100 to 300, preferably 150 to 250, and $C_{CHD}$ is in the range of 20 to 100, preferably 25 to 75. In a specific embodiment, $A_C$ is approximately 6.6, $B_{CSD}$ is approximately 201 and $C_{CHD}$ is approximately 43.6.

It is remarked here that all equations for BCS mentioned thus far show a negative correlation coefficient for the parameters. That is, when the parameter value increases, such as HD or SD, the BCS value will decrease. However, other parameter values may show a positive correlation coefficient, i.e. may give rise to an increase of the BCS if said other parameter value increases.

Figure 5:
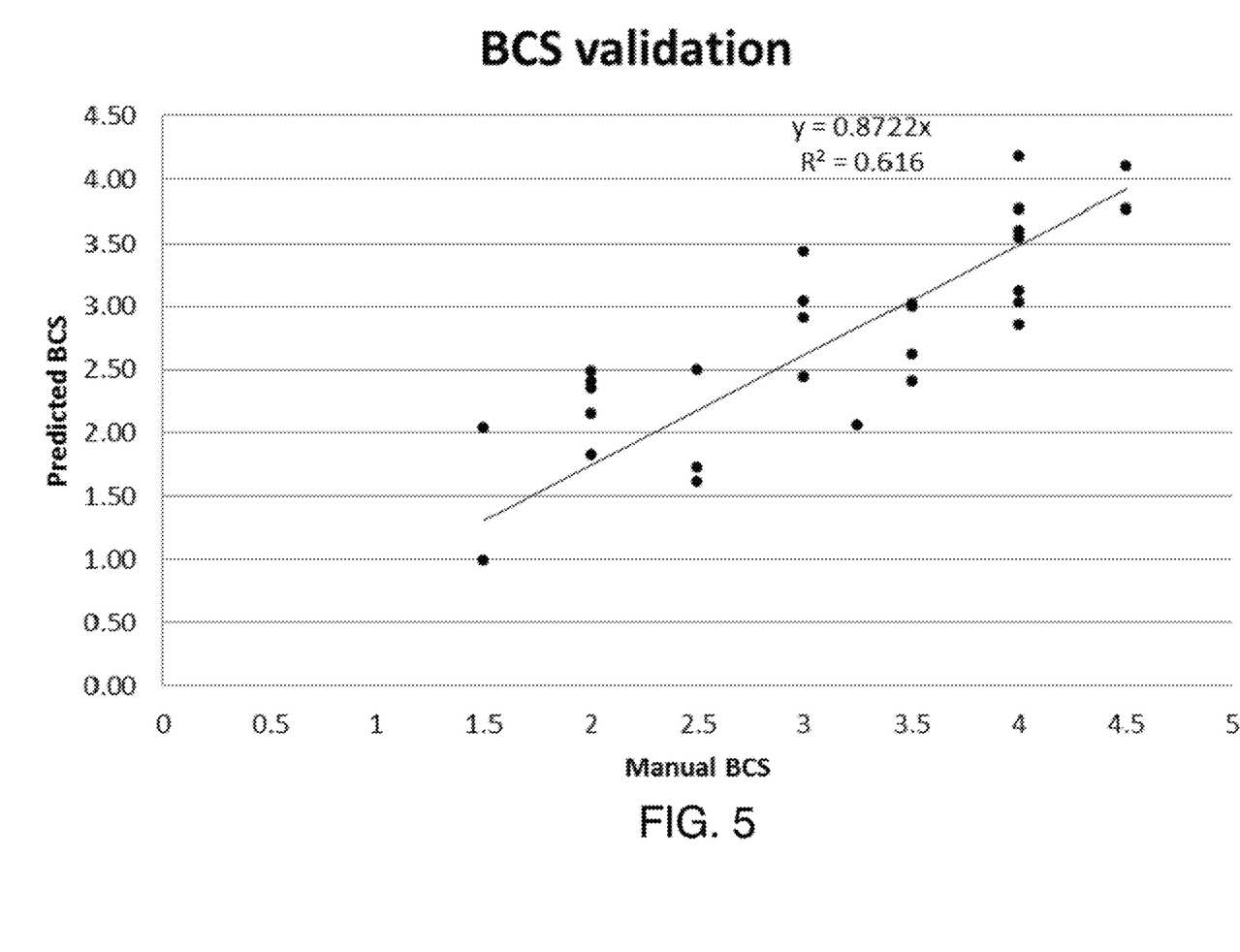
FIG. 5 shows an example of a comparison of the body condition scores with a method according to the invention and body condition scores with a conventional method.

FIG. 5 shows an example of the outcome of such calculation in which body condition scores BCS obtained on the basis of the combination of the height difference HD and the standard deviation SD are compared with body condition scores obtained with a conventional method.

The invention claimed is:

1. A method to determine a body condition score of an animal comprising:
   providing a three-dimensional camera system configured and arranged to record at least one three-dimensional image of the animal, and an image processing device to process the at least one three-dimensional image;
   recording the at least one three-dimensional image of the animal;
   processing the at least one three-dimensional image of the animal;
   wherein the processing of the at least one three-dimensional image comprises:
      forming a three-dimensional surface representation of a part of the animal from the three-dimensional image recorded by the three-dimensional camera system;
      determining, in the image, reference points of the animal, including at least one of hook bone points or pin bone points of the animal;
      selecting a surface part of the animal representative for a body condition of the animal using the reference points;
      determining an average height for a number of longitudinal lines of the surface part to obtain an average height cross section profile of the animal;
      determining a first parameter based on the average height cross section profile;
      analyzing the first parameter representative for a body condition of the animal of the selected surface part; and
      determining the body condition score based on the first parameter.

2. The method of claim 1, wherein the body condition score is calculated as:

$$BCS = A_{SD} - B_{SD} * SD,$$

wherein BCS is the body condition score, SD is the standard deviation of heights of at least a part of the average height cross section profile of the animal, and $A_{SD}$ and $B_{SD}$ are predetermined constants, wherein $A_{SD}$ is in a range of 5 to 9 and $B_{SD}$ is in a range of 200 to 500.

3. The method of claim 1, wherein the analyzing the first parameter comprises:
   determining a median height or an average height of the average height cross section profile;
   determining a highest point of the average height cross section profile; and
   determining a height difference between the highest point and the median height or the average height as a first parameter representative for a body condition score of the animal.

4. The method of claim 3, wherein the body condition score is calculated as:

$$BCS = A_{HD} + -B_{HD} * HD,$$

wherein BCS is the body condition score, HD is the difference in meters between the median height and the highest point of at least a selected part of the average height cross section profile of the animal, and $A_{HD}$ and $B_{HD}$ are predetermined constants, wherein $A_{HD}$ is in a range of 4 to 8, and $B_{HD}$) is in a range of 50 to 200.

5. The method of claim 2, wherein the selected part comprises 10 to 30 cm at each side of a highest point of the average height cross section profile of the animal.

6. The method of claim 1, wherein the surface part is selected from the group consisting of:
a trapezoidal surface part between hook bone points and pin bone points;
a triangular surface part between hook bone points and tail head point; and
a rectangular surface part extending, in a longitudinal direction of the animal, from a hook line connecting the hook bone points to a pin line connecting the pin bone points, and, in a direction perpendicular to the longitudinal direction 15 cm to 25 cm at each side from a spine line of the animal.

7. The method of claim 1, wherein the first parameter is a standard deviation of heights of the surface representation in the surface part.

8. The method of claim 1, wherein a relationship between the body condition score and the first parameter is obtained by linear regression.

9. The method of claim 1, further comprising:
analyzing a second parameter representative for a body condition of the animal; and
determining the body condition score based on the first parameter and the second parameter.

10. The method of claim 9, wherein the analyzing the second parameter comprises determining the second parameter based on an average height cross section profile.

11. The method of claim 10, wherein:

$$BCS = A_C \_BCSD * SD - CCHD * HD,$$

wherein BCS is the body condition score, SD is the standard deviation of heights of at least a selected part of the average height cross section profile of the animal, HD is the difference in meters between the median height and the highest point of at least a selected part of the average height cross section profile of the animal, and
wherein $A_C$, $B_{CSD}$ and $C_{CHD}$ are predetermined constants, wherein $A_C$ is in a range of 4 to 8, $B_{CSD}$ is in a range of 100 to 300, and $C_{CHD}$ is in a range of 20 to 100.

12. The method of claim 1, wherein the determining the body condition score is based on the first parameter and a body weight of the animal.

13. The method of claim 1, wherein the first parameter is a distance between a line connecting the hook bone points and a line connecting the pin bone points or the tail head point, combined with body weight of the animal.

14. The method of claim 1, wherein the first parameter is the surface area of the surface part, combined with body weight of the animal.

15. The method of claim 1, wherein the body condition score is expressed as a value from 1 to 5.

16. The method of claim 1, wherein the determining reference points comprises:
selecting a local part of the image in which a location of the respective reference points is expected, and
determining a location of the respective reference point by finding a specific characteristic of the respective reference point in the local part, or a lowest or highest surface point within the local part.

17. The method of claim 1, wherein the forming a three-dimensional surface representation of a part of the animal from the three-dimensional image recorded by the three-dimensional camera system comprises at least one of:
rotating the image based on the relative position of the camera system with respect to the animal;
removing background and noise in the image;
performing interpolation in the image;
centralizing the image.

18. The method of claim 17, wherein the centralizing the image comprises:
determining, in the image, a spine line of the animal, and translating and rotating the image to align the spine line with a central image axis.

19. An arrangement configured to determine a body condition score of an animal, comprising:
a three-dimensional camera system configured and arranged to record at least one three-dimensional image of the animal; and
an image processor to process the image;
wherein the camera system and image processing device are configured to perform a method according to claim 1.

20. A method to determine a body condition score of an animal comprising:
providing a three-dimensional camera system configured and arranged to record at least one three-dimensional image of the animal, and an image processing device to process the at least one three-dimensional image;
recording the at least one three-dimensional image of the animal;
processing the at least one three-dimensional image of the animal;
wherein the processing of the at least one three-dimensional image comprises:
forming a three-dimensional surface representation of a part of the animal from the three-dimensional image recorded by the three-dimensional camera system;
determining, in the image, reference points of the animal, including at least one of hook bone points or pin bone points of the animal;
selecting a surface part of the animal representative for a body condition of the animal using the reference points;
analyzing a first parameter representative for a body condition of the animal of the selected surface part; and
determining the body condition score based on the first parameter, wherein the surface part is selected from the group consisting of:
a trapezoidal surface part between hook bone points and pin bone points;
a triangular surface part between hook bone points and tail head point; and
a rectangular surface part extending, in a longitudinal direction of the animal, from a hook line connecting the hook bone points to a pin line connecting the pin bone points, and, in a direction perpendicular to the longitudinal direction 15 cm to 25 cm at each side from a spine line of the animal.

21. A method to determine a body condition score of an animal comprising:
providing a three-dimensional camera system configured and arranged to record at least one three-dimensional image of the animal, and an image processing device to process the at least one three-dimensional image;

recording the at least one three-dimensional image of the animal;

processing the at least one three-dimensional image of the animal;

wherein the processing of the at least one three-dimensional image comprises:

forming a three-dimensional surface representation of a part of the animal from the three-dimensional image recorded by the three-dimensional camera system;

determining, in the image, reference points of the animal, including at least one of hook bone points or pin bone points of the animal;

selecting a surface part of the animal representative for a body condition of the animal using the reference points;

analyzing a first parameter representative for a body condition of the animal of the selected surface part;

analyzing a second parameter representative for a body condition of the animal; and determining the body condition score based on the first parameter and the second parameter, wherein the analyzing the second parameter comprises determining the second parameter based on an average height cross section profile.

\* \* \* \* \*